June 18, 1935. L. J. PATTON ET AL 2,005,003
WHEEL HOLDER
Filed Aug. 16, 1934
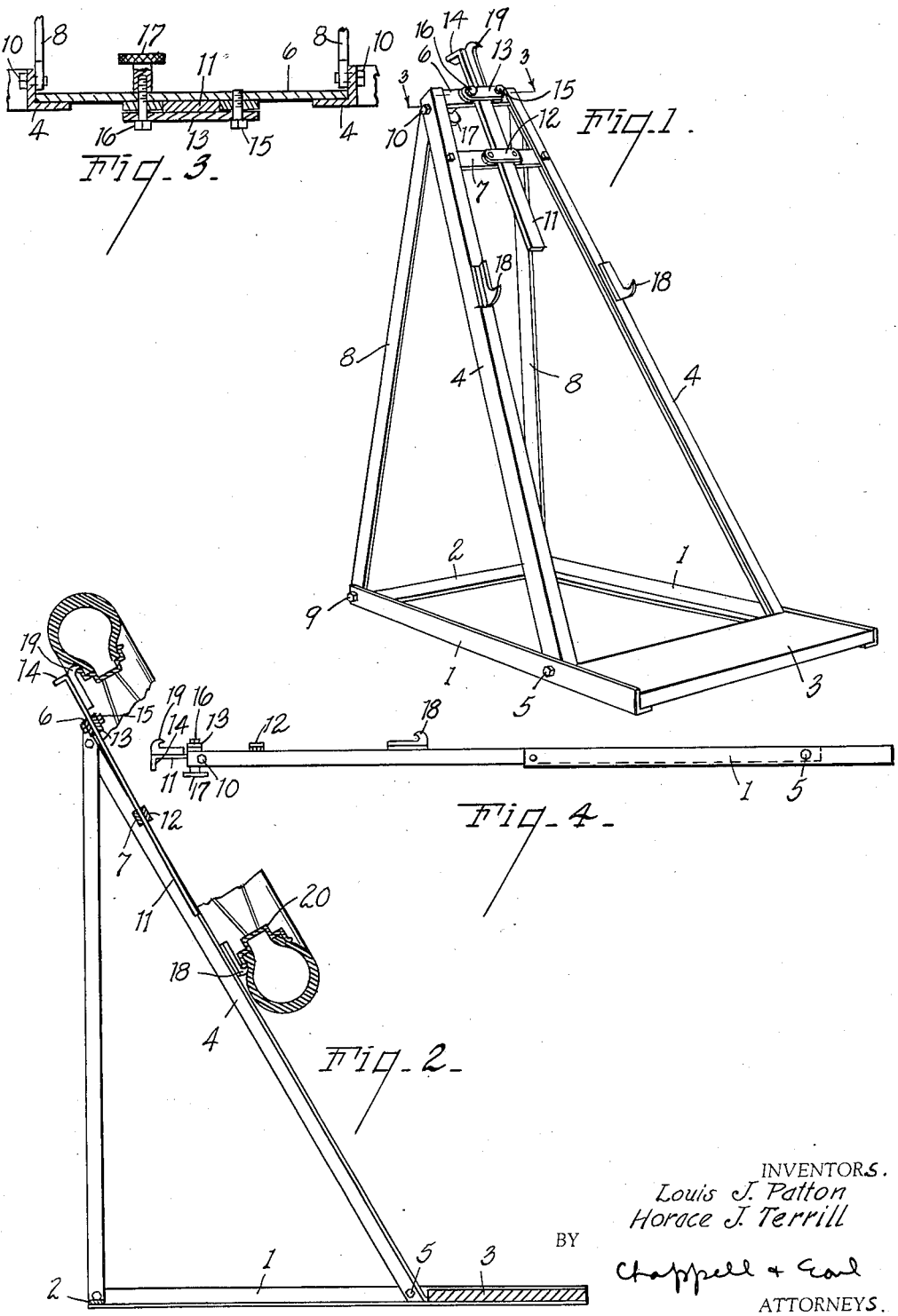
INVENTORS.
Louis J. Patton
Horace J. Terrill
BY
Chappell & Earl
ATTORNEYS.

Patented June 18, 1935

2,005,003

UNITED STATES PATENT OFFICE 2,005,003

WHEEL HOLDER

Louis J. Patton and Horace J. Terrill, Benton Harbor, Mich.

Application August 16, 1934, Serial No. 740,032

4 Claims. (Cl. 144—288)

The objects of this invention are:

First, to provide a simple and effective support for holding the rim of an automobile wheel or the wheel itself in a convenient position for removal or mounting of a tire thereon.

Second, to provide such an apparatus that will support the rim or wheel without marring the same.

Third, to provide such a support that is simple in construction and can be cheaply manufactured.

Fourth, to provide such a support that is especially adapted for use with the present day popular drop center rims.

Fifth, to provide such a support that can be folded flat for shipping.

Other objects and advantages pertaining to details of construction and operation will appear from the description to follow. A preferred embodiment of my invention is illustrated in the accompanying drawing, in which:

Fig. 1 is a perspective view of my improved support.

Fig. 2 is a side elevation in section showing a tire mounted on the support.

Fig. 3 is a detail sectional view on line 3—3 of Fig. 1.

Fig. 4 is a view of my apparatus folded flat for shipping.

The parts will be identified by their numerals of reference which are the same in all the views.

The stand consists of a base having angle iron side members 1 having a pair of their ends joined by an end member 2 and the other pair of ends joined by a wood or metal panel 3 which serves as a platform for the person using the stand which adds his weight to the apparatus for holding it on the floor, making it possible to have a portable apparatus which in use has the rigidity of a permanent support. 4, 4 are slanting support members each bolted at one end with a bolt 5 to the side members 1 of the base. These members are joined at their upper end by cross pieces 6 and 7, to form a supporting framework. At 8 we show supports for this framework which supports are bolted with bolts 9 to the ends of the base opposite from the platform 3. The members 4 are angle iron members and, as shown, the member 8 is bolted with bolts 10 to the upper end of members 4, the members 8 being disposed inside of the members 4 as shown in Figs. 1 and 3. At the upper end of the supporting framework formed by the members 4, 6 and 7, we provide a slide 11 which is mounted in slideways formed by the members 6 and 7 with the cross piece 12 on the members 7 riveted or bolted thereto and spaced therefrom to receive the slide 11 and the cross piece 13 spaced from the member 6. The end 14 of slide 11 is bent over as shown to provide a convenient handle for manipulating the slide. The cross piece 13 is fastened at one end to the member 6 with a bolt 15 and at the other end with a bolt 16 having a knurled nut 17, making it possible by tightening the nut 17 to clamp the slide 11 in any desired position.

On the faces of angle members 4, we provide upwardly facing hooks 18, one on each member. These hooks are so conformed that they will engage the inside of the edge of the peripheral groove of a tire rim and are especially adapted to engage the inner edge of the drop center rims now in such favor in the automotive industry. These hooks serve to support a wheel placed thereon without marring the finish of the wheel. A similar hook 19, but downwardly facing, is mounted on the slide 11 to be moved into engagement with a rim supported on the hook 18 to hold it firmly in place while work is being done on the tire on the rim or wheel thus supported.

In using the apparatus, the rim or wheel with an uninflated tire is placed on hooks 18 which engage the inner side of the rim and support the wheel and the hook 19 is then slid into adjustment with the upper part of the rim and the tightening of nut 17 firmly holds the wheel or rim in place. The angle at which the tire rests makes it very convenient for an operator standing upon platform 3 to remove the tire in the usual manner and the angle is such that in putting the tire on, the operator is in the best position to exert downward pressure to force the tire in place. The platform makes it possible for the operator to hold down the apparatus which can be portable and we thus provide a very convenient stable portable support for wheels or rims while tire repair work is being done.

In Fig. 2 we show a rim 20 supported on the apparatus and it will be appreciated that with such a simple apparatus we obtain a most satisfactory support.

In Fig. 4 we show the apparatus in folded position for shipping. The bolts 9 are removed and the members 8 are swung inside of the members 4 and the whole apparatus is folded as shown with the members 8 and 4 lying inside of the members 1 and the base.

We have shown and described the apparatus in the forms preferred by us, but wish to claim the same broadly as well as specifically, as pointed out in the appended claims.

Having thus described our invention, what we claim as new and desire to secure by Letters Patent is:

1. In an apparatus for supporting the rim of an automobile wheel for tire repair work, the combination of a base comprising a pair of angle iron side members having one pair of adjacent ends joined by an end member and the other ends joined by a platform, a pair of slanting angle iron support members each bolted to one of said side members at a point spaced from the ends thereof and having their upper ends fastened together to form a supporting framework, a pair of supports for said framework each having one end bolted to one of said side members at the end opposite said platform and the other end bolted to the upper end of said slanting supporting framework, an upwardly facing hook on each of said slanting support members adapted to engage the inside of the peripheral groove of a rim of an automobile wheel to support the same, a slideway at the upper end of said slanting supporting framework, a slide in said slideway, a downwardly facing hook on said slide adapted to engage the peripheral groove of a rim of an automobile wheel supported on said upwardly facing hooks, and means for retaining said downwardly facing hook in engagement with the rim of a wheel thus supported.

2. In an apparatus for supporting the rim of an automobile wheel for tire repair work, the combination of a base having a pair of angle iron side members, a pair of slanting angle iron support members each bolted to one of said side members at a point spaced from the ends thereof and having their upper ends fastened together to form a supporting framework, a pair of supports for said framework each having one end bolted to one of said side members at one end and the other end bolted to the upper end of said slanting supporting framework, an upwardly facing hook on each of said slanting support members adapted to engage the inside of the peripheral groove of a rim of an automobile wheel to support the same, a slideway at the upper end of said slanting supporting framework, a slide in said slideway, a downwardly facing hook on said slide adapted to engage the peripheral groove of a rim of an automobile wheel supported on said upwardly facing hooks, and means for retaining said downwardly facing hook in engagement with the rim of a wheel thus supported.

3. In an apparatus for supporting the rim of an automobile wheel for tire repair work, the combination of a base, a pair of slanting support members one bolted to each side of said base at a point spaced from the ends thereof and having their upper ends fastened together to form a supporting framework, a pair of supports for said framework each having one end bolted to one side of said base and the other end bolted to the upper end of said slanting supporting framework, an upwardly facing hook on each of said slanting support members adapted to engage the inside of the peripheral groove of a rim of an automobile wheel to support the same, a slideway at the upper end of said slanting supporting framework, a slide in said slideway, a downwardly facing hook on said slide adapted to engage the peripheral groove of a rim of an automobile wheel supported on said upwardly facing hooks, and means for retaining said downwardly facing hook in engagement with the rim of a wheel thus supported.

4. In a device for supporting the rim of an automobile wheel for tire repair work, the combination of a slanting support against which a rim may be laid, said support having a pair of spaced upwardly facing hook members projecting therefrom to engage in the edge of the peripheral groove of a rim lying against said support to cooperate with said support in supporting said rim, and a downwardly facing hook member projecting from said support and mounted above and for movement to or away from said first mentioned hook members along the plane of said support and adapted to engage in the edge of the peripheral groove of a rim supported in said upwardly facing hooks and against said support, and means for holding said downwardly facing hook in engagement with a rim thus supported.

LOUIS J. PATTON.
HORACE J. TERRILL.